United States Patent [19]

Escola et al.

[11] Patent Number: 5,421,003
[45] Date of Patent: May 30, 1995

[54] DISK STORAGE SYSTEM WITH FAULT TOLERANT MEDIA MAINTENANCE

[75] Inventors: Dennis R. Escola, Gilroy; Steven D. Gerdt, San Jose; Barrie N. Harding, San Jose; Lloyd R. Shipman, Jr., San Jose, all of Calif.

[73] Assignee: International Business Machines Corporation, Armonk, N.Y.

[21] Appl. No.: 946,982

[22] Filed: Sep. 17, 1992

[51] Int. Cl.$^6$ .............................................. G06F 11/34
[52] U.S. Cl. .................................................. 395/575
[58] Field of Search .................. 371/12, 13; 364/273.4, 364/273.5, 941.1, 941.7, 941, 976.4, 241.2, 242.1, 285, 285.2; 395/575

[56] References Cited

U.S. PATENT DOCUMENTS

| | | | |
|---|---|---|---|
| 4,234,920 | 11/1980 | Van Ness et al. | 364/200 |
| 4,327,410 | 4/1982 | Patel et al. | 364/200 |
| 4,611,289 | 9/1986 | Coppola | 364/200 |
| 4,648,031 | 3/1987 | Jenner | 364/200 |
| 4,697,266 | 9/1987 | Finley | 371/12 |
| 4,703,481 | 10/1987 | Fremont | 364/200 |
| 4,814,971 | 3/1989 | Thatte | 364/200 |
| 4,844,630 | 7/1989 | Hagen et al. | 364/900 |
| 5,008,786 | 4/1991 | Thatte | 364/200 |
| 5,321,698 | 6/1994 | Nguyen et al. | 371/12 |

FOREIGN PATENT DOCUMENTS

242519 2/1990 Japan.
2236747 9/1990 Japan.

*Primary Examiner*—Robert W. Beausoliel, Jr.
*Assistant Examiner*—Trinh Tu
*Attorney, Agent, or Firm*—G. Marlin Knight; Esther E. Klein

[57] ABSTRACT

A data storage system is described which provides for fault tolerance during execution of a media maintenance program on a selected track of nonvolatile data storage. Checkpoint data for the media maintenance program is stored in nonvolatile storage prior to writing control information on the selected track during the execution of the media maintenance program. The checkpoint data includes an address in the media maintenance program for resuming execution in the event that the media maintenance process is aborted. The checkpoint data is read from the nonvolatile storage area after media maintenance has been aborted by a fault, typically after power has been reapplied to the system. The execution environment for the media maintenance program is restored by storing data in the RAM of the controller which duplicates the control data needed by the particular segment of the media maintenance program which will be restarted. After the environment is restored, the execution of the media maintenance program resumes at the address in checkpoint data stored prior to writing the control data on the selected track.

15 Claims, 2 Drawing Sheets

DISK STORAGE SYSTEM WITH FAULT TOLERANT MEDIA MAINTENANCE

TECHNICAL FIELD

The present invention relates to methods and systems in the field of storage subsystems and more particularly to methods of performing successful media maintenance in the presence of system faults.

BACKGROUND OF THE INVENTION

Typical direct access storage subsystems (DASS) include a controller connected to one or more disk files. The disk files are also called head-disk-assemblies (HDAs). The controller may be a physically separate device or may be integrated with the HDAs in a single device. The HDAs contain the actual data storage hardware. The controller provides the external computer interface for the subsystem. DASS is used herein to refer to the combination of one or more HDAs with a controller whether they are in separate devices or integrated in a single device.

Each HDA contains one or more platters or disks on which data is recorded. The data is written in concentric circles on the disks which are called tracks. The data on the tracks must be organized according to a set of rules which are typically fixed in the design of the disk system. For example, the design of the disk system may require that the data be written in fixed length records or the design may allow variable length records to be written. Fixed record length designs, often referred to as fixed block architectures (FBA), typically subdivide tracks into sectors. One known technique for writing and reading variable length records is to use the count-key-data (CKD) format. As used hereinafter, 'tracks' means tracks or sectors unless otherwise noted. The data on the tracks typically includes user data and system control data.

Because defects may occur in the disk surfaces it is conventional to reserve spare or alternate space on the disks which can be used to logically replace areas with defects. In a device that uses sectors, the additional space will be alternate sectors. Variable record length devices typically use entire tracks for alternates. To distinguish them from alternate tracks, the original tracks are called primary tracks. The design of the disk system must provide a way to establish a linkage between a primary track and an alternate track so that some types of read and write commands which reference the primary track will be executed upon the alternate track. One method of achieving this linkage is to reserve a portion of each track for control information which determines whether an alternate track has been established for that track and, if so, gives the address of the alternate track. There may also be separate control data kept on the disk file which identifies the tracks deemed to be defective. The design typically allows a subset of the available commands to ignore the linkage so that, for example, read and write tests may be performed on the primary track even after the linkage has been established.

Because the use of alternate tracks may have undesirable effects, techniques have been developed for adjusting for defects in a track without using an alternate track. In one scheme control information is written on the track ahead of the detect which allows the system to ignore or skip over the defect. This control information may be called skip-displacement information. Since skip-displacements cannot correct for an unlimited number of defects, it is customary to provide alternate track capability in addition to skip-displacement capability.

In a system which allows skip-displacement information or its equivalent to be used to adjust for defects, it is possible to perform tests on a suspect track to determine exactly where the defects are, then write skip-displacements codes on the disk to correct the problem. Testing the track for errors requires that data be written on the track which destroys the user data that may be on the track. Therefore, prior to testing the suspect track, the user data must be copied to a backup track. If the testing and writing or skip-displacement information successfully adjusts for all of the defects on the track, then the user data can be copied from the backup track back to the original track. If the defects cannot be corrected then the system must use its alternate track technique to replace the bad track. The process of testing the track for defects and writing skip-displacement type information to correct for defects is known as media maintenance (MM). Media Maintenance for fixed block architecture (FBA) devices is accomplished by marking blocks defective and either assigning an alternate block or 'slipping' the contents of blocks down a cylinder to use a spare block whose normal location is at the end of a cylinder. Since the proper testing of the suspect track requires that a very large number of read and writes be performed, media maintenance may require several minutes for one track.

The conventional method of using an alternate location in count-key-data (CKD) DASS systems requires the ability to read and write control information at the beginning of the original track as well as on the alternate location. The beginning of the track is reserved for the 'track header' which consists of Home Address (HA) and Record Zero (R0) count fields. The HA contains a flag which indicates whether an alternate track has been assigned and the R0 count field is used to record the pointer to all alternate track. For those cases where the part of the track affected by a media defect is in the header, customer data access is lost along with the ability to assign an alternate location for customer usage while media maintenance is being performed.

The MM process may be interrupted by power failures or other system faults which prevent completion of the MM operations. This may result in leaving the device in an unknown state with respect to the MM operations which were in process.

O. Akiba in a published Japanese patent application (JP 02-236747) has purportedly described a method for restarting a duplexed DASD after a power failure in such a way as to insure that the integrity of duplexing is maintained. When a power failure monitoring device detects a power failure, a CPU retrieves the control table of the duplexed DASD and takes out the equivalent information such as the block number of an updating processing under execution, etc., and duplicates and saves it on the nonvolatile memory. When the power source is recovered, the processing is restarted to complete the duplexing.

Y. Katsuki in a published Japanese patent application (JP 02-42519) has purportedly described a method for restarting a computer application after a power failure by storing the processing state on a disk. The IPL program reads the state data from disk and restarts the application.

U.S. Pat. No. 4,648,031 to E. H. Jenner describes a method for restarting a computer system after an interruption using two types of data structures. The first data structure contains the locations of interest in a recovery log for a "work unit". A second structure is maintained for each of the resource managers containing its operational state, and the relative addresses in the recovery log of the beginning and ending of its interest scope. Resource managers may be restarted by reestablishing the state of the managed collections during a current status phase, starting with the most recent checkpointed state advanced by subsequent records of changes in the log to the point of interruption.

In a published European patent application (EP-295424) D. J. Haderle, et al. describe a method for use in database systems which establishes a prior point of consistency including partial transaction rollback in a transaction-oriented system using write-ahead logging. In response to a failure the system determines the point in the log at which REDO processing is to start. Data are gathered, in an analyzer phase, by scanning the log from the last complete checkpoint to the log end to find data on dirty pages and to identify those transactions which were executing at the instant of failure. The activities are repeated for all transactions up to the failure point and log modifications are input on the pages of the log. In the UNDO phase all currently-executing transactions are; rolled back.

Thus, there is a need not solved by the prior art for MM techniques which guarantee completion despite system faults.

SUMMARY OF THE INVENTION

The invention is a controller for a data storage and retrieval system, a data storage and retrieval system and a method of operating the controller or system. The controller has means for executing a media maintenance program on a selected track of nonvolatile data storage. Checkpoint data for the media maintenance program is stored in nonvolatile storage prior to writing control information on the selected track during the execution of the media maintenance program. The checkpoint data includes an address in the media maintenance program for resuming execution in the event that the media maintenance process is aborted. The checkpoint data is read from the nonvolatile storage area after media maintenance has been aborted by a fault, typically after power has been reapplied to the system. The execution environment for the media maintenance program is restored by storing data in the RAM of the controller which duplicates the control data needed by the particular segment of the media maintenance program which will be restarted. After the environment is restored, the execution of the media maintenance program resumes at the address in checkpoint data stored prior to writing the control data on the selected track. This system provides a high level assurance that the media maintenance program will not leave the track in an unknown and potentially unusable state even when there are power failures or other faults that prevent the media maintenance program from completing until the fault is removed.

The control information written on the disk typically includes data indicative of whether an alternate track has been assigned for the selected track and the location of the alternate track. The execution environment typically includes task control block data for the media maintenance program and the control information for the selected track. Preferably two copies of the checkpoint data are stored to increase the robustness of the system.

Additionally the address of an error recovery procedure can be recorded prior to each device operation which identifies the routine to be executed responsive to an error occurring during the device operation which does not prevent the program from continuing.

DETAILED DESCRIPTION OF THE INVENTION

Figure 1:
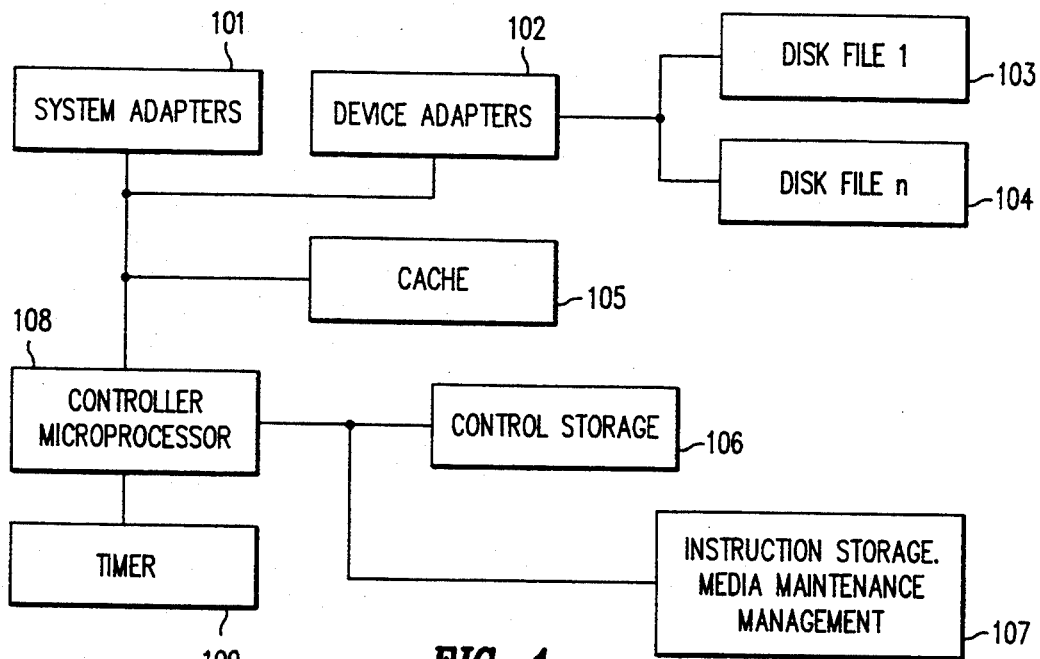
FIG. 1 is a block diagram of the components of a disk subsystem utilizing the invention.

The detailed embodiment of the invention which will be described is a controller for a DASS and the completed DASS. The broad components of the system of the invention will be described with reference to FIG. 1. The interfaces to the one or more computers using the DASS are called system adapters 101. The interfaces to the one or more disk files contained in the DASS are called device adapters 102. The disk files 103, 104 contain the heads and actual magnetic or opto-magnetic disks. Any type of nonvolatile storage devices are acceptable. In some data storage systems the disk files are separately packaged components and the other components shown in FIG. 1 are called the subsystem (or cluster) controller. The cache 105 for the system is shown, but is optional. The supervisory function of the system is performed by the controller microprocessor 108. The instructions to be executed by the microprocessor are stored in the instruction storage 107 which may be RAM or ROM. The system has a timer 109 which is used to generate time stamps. When RAM is used for the instruction storage, the control instructions (microcode) will be loaded into the RAM from one of the disk files when the DASS is initialized. The control storage 106 is RAM in which the controller may store temporary data indicative of the status of operation, etc. The MM management function of the invention is controlled by action of the microprocessor executing specially written microcode stored in the instruction storage. Some or all of the functions described below could also be implemented using standard electrical engineering techniques instead of in microcode or firmware.

Each disk file contains one or more platters or disks on which data is recorded. The data is written in concentric circles on the disks which are called tracks. Most of the tracks are allocated to user data, but a few tracks on each disk file are allocated for subsystem control data as subsystem control tracks. The user data may be arbitrarily written and read upon commands from the computers. The subsystem control data is closely controlled by the controller and is not directly readable or writeable by user programs.

The DASS of the invention provides:
extended track header management functions;
nonvolatile Alternate Location Pointer Facility; and
internal subsystem checkpoint/restart of media maintenance processes.

Track Header Management

Track header management provides the following extended error recovery functions:

1. Track Header Reconstruction

If a track header is lost or becomes unreadable, tile track header can be reconstructed and customer data can be recovered. Reconstruction and data recovery use methods that have been designed for use solely by internal subsystem requests.

If a permanent read error occurs in the header area of a primary track, the header can be reconstructed from redundant information that is stored on the device. In addition, special recovery procedures are employed which allow the subsystem to bypass tile failed header area and recover the customer data which resides on the primary track.

2. Track Header Verification Recovery

Several Media Maintenance operations write the track headers of customer primary tracks. Whenever a track header is written, the subsystem verifies that the header is usable by performing a readback check.

If a readback check is not successful, then recovery includes a relocation of the track header by skipping the defective area. Thus, the recovery process involves relocating by rewriting the track header at a different point and subsequently performing another readback check. If errors continue, this recovery process will continue until all available relocation points have been attempted.

Alternate Location Pointer Facility

The nonvolatile Alternate Location Pointer Facility (ALPF) is used to ensure the integrity of the Media Maintenance operations and to direct the subsystem on what actions it should take pertaining to the status or the track header. This processing is the mechanism by which access to customer data can always be guaranteed.

Internal Restart of Subsystem Processes

Automatic subsystem checkpoint/restart of media repair operations is controlled by subsystem device initialization processes as well as dual-copied subsystem files. On each storage device there are certain tracks reserved for use by the subsystem. As an MM operation progresses, the subsystem writes checkpoint records at restart points in the function. Every piece or information required for the MM operation to resume at a restart point is written on the device on a track reserved for the subsystem. At the time a device is being initialized to a "ready" state (after a catastrophic failure or power up), the subsystem examines the checkpoint record on the device to determine if a MM operation was disrupted. If so, the subsystem recreates the proper environment for the MM operation, restarts the operation at the recorded checkpoint location, and allows the operation to complete. No customer data is lost due to the disrupted MM operation and the customer tracks are left in an expected state as the device once more becomes available to the host.

Some key points in the invention are:

1. Ensured automatic resumption and completion of critical tasks

Assures that, when a media repair function is unexpectedly interrupted by failure or power loss, the affected device is placed in a consistent and usable condition before customer access is allowed subsequent to restoring the hardware or the power.

2. Reconstruction of track headers

The reconstruction of track headers is accomplished by accessing redundant information on the device.

3. Data Recovery with unreadable track headers

In spite of an unreadable track header, customer data can still be read by using special internal-subsystem procedures to bypass tile header area and attempt reads at points where customer data would be located.

4. Track header relocation

If a track header is unreadable during verification, verification recovery includes relocation attempts which bypass the defective media area.

5. An Alternate Pointer Facility

Used to ensure the integrity of media repair processes and to direct the subsystem on what actions it should take pertaining to the status of the track header during MM operations.

Track Header Reconstruction

There are a number of specialized services that Track Header Reconstruction employs:

1. Recover Defect Information
2. Recover R0 Count
3. Recover R0 Data
4. Read alternates to get linkage Once the Reconstruction has completed successfully, the MM operation that experienced the original error can resume its operation. If the request was Preserve Track or Restore Track (which are well known commands executable by a DASS), then the Data Recovery feature is employed which involves reading the first customer record based on the cell number. The cell number is known as an output from Reconstruction.

Track Header Verification Recovery

During Media Maintenance operations, track headers may be written. A readback check of a header always occurs after a header is written. If a readback check encounters an error, then Track Header Verification Recovery is invoked. Verification Recovery involves the following steps:

1. Relocation and rewrite

Note: A Skip Control byte which is written on disk is used to indicate which skips are valid skips.

2. Reread

Alternate Location Pointer Facility

The Alternate Location Pointer Facility (ALPF) is one of the critical Media Maintenance data objects. It is stored in the Device Status Block in RAM and in a nonvolatile storage area on non-customer data tracks on the head-disk-assembly (HDA). This nonvolatile storage area is called the Device Status File. Whenever one of the Media Maintenance data objects is updated, the entire set of Media Maintenance data objects in the Device Status File is updated to ensure all the information is kept current.

The ALPF is used to ensure that Media Maintenance operations do not cause a data integrity problem or loss of access to customer data on an assigned alternate track. The ALPF is set in the following situations:

When a permanent data check occurs in the primary track header and cannot be recovered through Header Verification Recovery procedures.

When a permanent error occurs during formatting of a primary track that has an assigned alternate.

Before an operation is checkpointed in the execution of the Preserve Track, Track Defect Analysis, and Restore Track orders.

By any of the Media Maintenance requests that write the primary header.

Any normal I/O operation will be processed even if the ALPF is set. This ensures continued access to all customer data. If the ALPF is set then it will be used to determine the proper location for access of the data.

When processing these MM requests the subsystem microcode will position the device according to the input parameters specified in the operation. It will then check the ALPF and if the ALPF is set the microcode will then compare the position address against the primary track address in the ALPF. If they do not match then exception status is indicated and the operation is terminated. If a match occurs while processing a Restore Track, Track Defect Analysis, or Write Skip Assignments request, processing will continue. If a match occurs while processing any of the other requests, then it will be detected and reported.

Guaranteed Completion

1. Overview

Microcode activity is governed within the DASS of the invention by the contents of several types of control blocks. Two of these control blocks contain dynamic data that are essential for the successful resumption of a MM operation. These control blocks are called the device Status Block (DSB) and the Task Control Block (TCB). Snapshots of the DSB and TCB are taken at potential restart points and they are placed in a Checkpoint Record that resides on the device. Two identical checkpoint records are written; if the first becomes unreadable, the second will be available to ensure access to the checkpoint data.

During resumption from a checkpoint, the TCBs (always two) and the DSB must be restored with values they contained at the point of the checkpoint location. In addition, the data buffer must be properly reconstructed. The operation which has been disrupted does not "know" that it has been disrupted. The environment has been restored so that the checkpoint operation is transparent to MM.

2. The Alternate Location Pointer Facility

The ALPF is a facility developed to insure access to customer data on an alternate location while the associated customer track is being rewritten, or an unrecoverable failure has occurred in Home Address (HA) or Record 0 (R0) of the customer track during MM. The ALPF parameters are totally contained in the DSB. They consist of a flag to indicate if the facility is active, parameters identifying the customer track, and parameters indicating the associated alternate location. These are identified below in the DSB.

3. The DSB

Several DSB parameters peculiar to an MM operation are saved during the operation and retrieved for checkpoint resume. These are:

a. DSB Status

A flag is set that precludes more than one MM operation to be active on a device at one time. Three other flags are transferred to the DSB Status; one flag indicates whether the ALPF is active, and the remaining two flags indicate if either or both of the two checkpoint records are invalid.

b. MM Alternate Bit Maps

There are two bit significant parameters that indicate which customer alternate; locations are in use and which have been marked defective.

c. Subsystem Alternate Bit Maps

There are two bit significant parameters that indicate which subsystem alternate locations are in use and which have been marked defective.

d. MM Customer Address

There are two parameters that contain the cylinder address and head address of the customer track. These are components of the ALPF.

e. MM Alternate Address

There are two parameters that identify the associated alternate location. These are components of the ALPF.

f. Error Recovery Flags

There are two parameters containing flags for error recovery that are set with a bit that indicates logging of data check type errors should not be done. These are always active during MM operations.

4. The TCB

Two key parameters that are retained in the TCB are the Segment Address and Error Recovery Procedure (ERP) Return address. It is the Segment Address that contains the program store address for the resumption of the MM operation. ERP Return contains the program store address that will gain control in the event an unrecoverable error occurs (including Check 1).

5. The MM Operation

Figure 2:
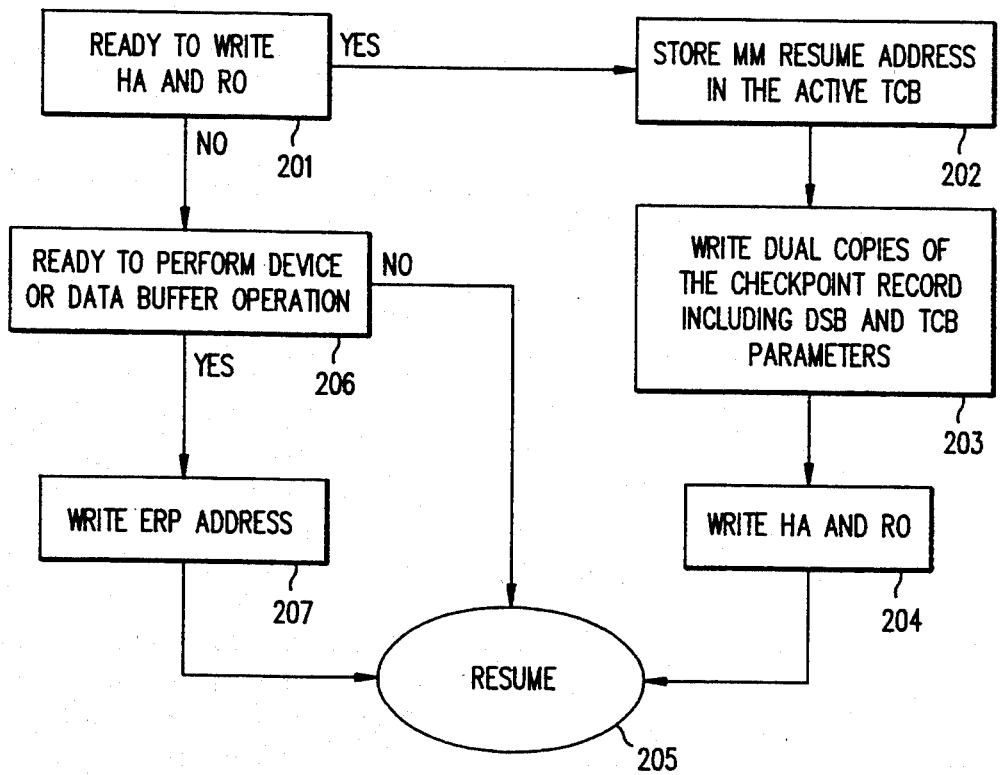
FIG. 2 is a flowchart illustrating the logic of checkpointing the MM operation.

FIG. 2 illustrates the logic of checkpointing the MM operation. During the execution of a checkpointed MM operation, the checkpoint record is written just prior to writing HA and R0 on a track. When preparation is being made to write an HA and R0 201, the program store address that is executed following the invocation of the update checkpoint record routine is placed in the Segment Address in the active TCB 202. This address is stored in the checkpoint record and will be the resume instruction for the MM operation. Dual copies of the checkpoint record including the DSB and TCB parameters are stored in the system tracks on disk 203. The HA and R0 are then written 204. The conventional MM process is then resumed 205. The ERP Return is also written when preparing for any device or data buffer operation 206, 207. It contains the program store address that will be invoked in the event of any unrecoverable error. The MM operation will detect a Check I condition in this error path.

6. The Catastrophic Failure

A catastrophic failure is a Check 1 (microprocessor hardware failure) or unexpected loss of power. In the case of a Check 1, control will be returned to the MM function at the program store address contained in ERP Return. The MM function will determine if a Check 1 has occurred. If a Check I has occurred and the checkpoint record is active, it will invoke the checkpoint resume function. If a Check 1 has occurred and the checkpoint record is not active, the MM operation will follow a path that allows it to be restarted from the beginning. If there has been an unexpected loss of power, the subsystem executes the checkpoint resume function when power is restored, as a matter of course.

7. The Checkpoint Resume Function

Figure 3:
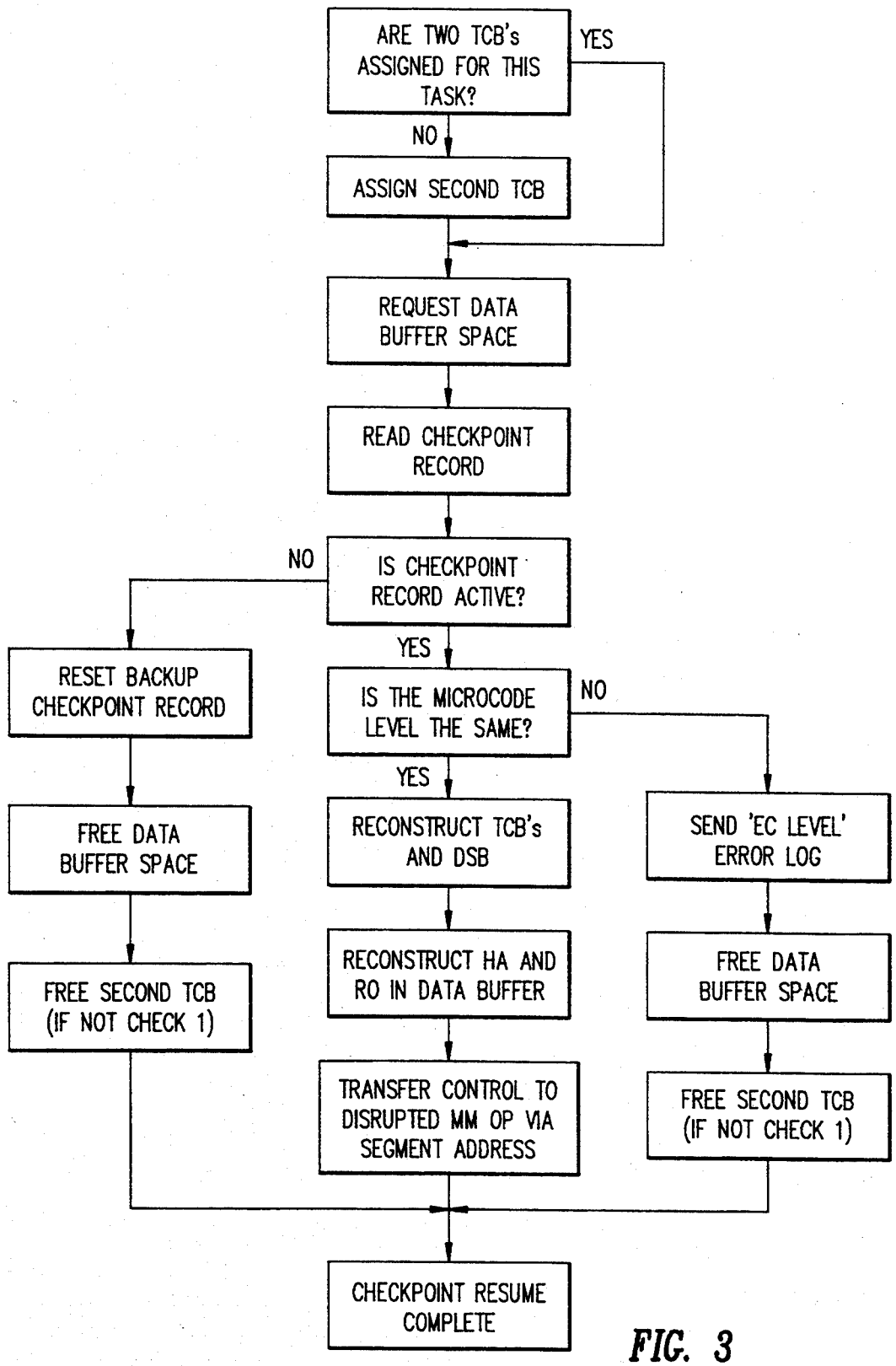
FIG. 3 is a flowchart illustrating the logic flow for the checkpoint resume function.

The logic flow for the checkpoint resume function is shown in FIG. 3. The checkpoint resume function will determine if there are two TCBs associated with this task. If there are, the environment is Check 1 recovery; otherwise, the environment is Power Up. In the Power Up environment the checkpoint resume function needs to acquire a second TCB at this point. The checkpoint resume function will then request the appropriate amount of data buffer space, for example, 128K or 256K bytes. It then reads the checkpoint record.

The checkpoint resume function determines if the checkpoint record is active (the checkpoint record is not active if its first word is null). If the checkpoint record is active, the checkpoint resume function checks that the microcode level at the time the checkpoint record was written is the same as the current environment. If the microcode levels match, the checkpoint resume function will then use values from the checkpoint record to reconstruct parameters in the DSB and TCBs necessary for the disrupted MM operation. It will then build the HA and R0 fields in the data buffer and transfer control to the disrupted MM operation via the Segment Address found in the checkpoint record. The MM operation is then executed to completion.

If the current and previous microcode levels do not match, an error log is generated which results in a Service Information Message (SIM) for corrective action.

Using the foregoing specifications the invention may be implemented using standard programming and/or engineering techniques. The resulting program(s) may be stored on disk, diskettes, memory cards, ROM or any other memory device. For execution, the program may be copied into the RAM of the system. One skilled in the art of computer science will easily be able to combine the software created as described with appropriate general purpose or special purpose computer hardware to create a computer system embodying the invention. While the preferred embodiment of the present invention has been illustrated in detail, it should be apparent that modifications and adaptations to that embodiment may occur to one skilled in the ad without departing from the scope of the present invention as set forth in the following claims.

What is claimed is:

1. A controller for a data storage and retrieval system having a processor being interconnected to a RAM, a nonvolatile data storage having a plurality of tracks for storing data, and means for transmitting and receiving data to and from a computer, comprising:
   means for executing a media maintenance program on a selected track of the nonvolatile data storage;
   means for storing in a selected area of the nonvolatile data storage, checkpoint data for the media maintenance program prior to writing control information on the selected track during an execution of the media maintenance program, the checkpoint data including an address in the media maintenance program for resuming execution in the event that the media maintenance program is aborted;
   means for reading the checkpoint data from the selected area of the nonvolatile data storage after the media maintenance program has been aborted by a fault;
   means for storing execution environment data as specified by the checkpoint data in the RAM to restore an execution environment for the media maintenance program after the media maintenance program has been aborted by a fault; and
   means for resuming execution of the media maintenance program at the address in the checkpoint data after the media maintenance program has been aborted by a fault.

2. The controller of claim 1 wherein the means for reading the checkpoint data is activated each time power is applied to the controller.

3. The controller of claim 1 further comprising:
   means for storing as part of the checkpoint data, prior to each device operation during the execution of the media maintenance program, an address of an error recovery procedure; and
   means for executing the error recovery procedure at the address in the checkpoint data responsive to an error occurring during a device operation.

4. The system of claim 1 further comprising means for storing a second copy of the checkpoint data on the storage device each time the means for storing checkpoint data is activated.

5. A data storage and retrieval system having a processor in communication with a RAM and a nonvolatile data storage, comprising:
   means for executing a media maintenance program on a selected track of nonvolatile data storage;
   checkpoint storage means for storing, in a selected area of the nonvolatile storage, checkpoint data prior to writing control information on the selected track during an execution of the media maintenance program, the checkpoint data including an address in the media maintenance program for resuming execution in the event that the media maintenance program is aborted by a hardware fault;
   means for reading the checkpoint data for the media maintenance program from the selected area of the nonvolatile storage after the media maintenance program has been aborted by a hardware fault;
   RAM storage means for storing execution environment data as specified by the checkpoint data in the RAM to restore the execution environment for the media maintenance program after the media maintenance program has been aborted by a hardware fault; and
   means for resuming execution of the media maintenance program at the address in the checkpoint data after the media maintenance program has been aborted by a hardware fault.

6. The system of claim 5 wherein the control information includes data indicative of whether an alternate track has been assigned for the selected track and the RAM storage means for storing data further comprises means for storing task control block data for the media maintenance program and for storing the control information for the selected track in a data buffer used by the media maintenance program.

7. The system of claim 5 wherein the means for reading the checkpoint data is activated each time power is applied to the system.

8. The system of claim 5 further comprising:
   address storage means for storing as part of the checkpoint data, prior to each device operation, an address of an error recovery procedure; and
   means for executing the error recovery procedure at the address in the checkpoint data responsive to an error occurring during a device operation.

9. The system of claim 5 further comprising means for storing a second copy of the checkpoint data each time the means for storing checkpoint data is activated.

10. A method of executing a media maintenance program on a selected track in a data storage and retrieval system having a processor, a RAM and a nonvolatile data storage, comprising the steps of:

storing, in a selected nonvolatile storage area, checkpoint data prior to writing control information on the selected track during an execution of the media maintenance program, the checkpoint data including an address in the media maintenance program for resuming execution in the event that the media maintenance program is aborted, reading the checkpoint data from the selected nonvolatile storage area after media maintenance has been aborted by a fault;

storing data from the checkpoint data in the RAM to restore an execution environment for the media maintenance program after media maintenance has been interrupted by a fault; and resuming execution of the media maintenance program, using the execution environment, at the address in checkpoint data after media maintenance has been interrupted by a fault.

11. The method of claim 10 wherein the step of reading the checkpoint data is performed each time power is applied to the system.

12. The method of claim 10 further comprising the steps of:

storing as part of the checkpoint data, prior to each device operation, an address of an error recovery procedure; and executing the error recovery procedure at the address in the checkpoint data responsive to an error occurring during a device operation.

13. The method of claim 10 further comprising the step of storing a second copy of the checkpoint data each time the step of storing checkpoint data is executed.

14. A controller for a data storage and retrieval system having a processor in communication with a RAM, a nonvolatile data storage, and means for transmitting and receiving data to and from a computer, comprising:

means for executing a media maintenance program on a selected track of nonvolatile data storage;

means for storing, in a selected area of the nonvolatile storage, checkpoint data for the media maintenance program prior to writing control information on the selected track during an execution of the media maintenance program, the checkpoint data including an address in the media maintenance program for resuming execution in the event that the media maintenance program is aborted by a fault, and the control information including data indicative of whether an alternate track has been assigned for the selected track;

means for storing task control block data for the media maintenance program and the control information for the selected track in a data buffer;

means for reading the checkpoint data from the selected area of the nonvolatile storage after the media maintenance program has been aborted by a fault;

means for storing data as specified by the checkpoint data in the RAM to restore the execution environment for the media maintenance program after the media maintenance program has been aborted by a fault; and means for resuming execution of the media maintenance program at the address in the checkpoint data after the media maintenance program has been aborted by a fault.

15. A method of executing a media maintenance program on a selected track in a data storage and retrieval system having a processor, a RAM and a nonvolatile data storage, comprising the steps of:

storing, in a selected area of the nonvolatile storage, checkpoint data prior to writing control information on the selected track during an execution of the media maintenance program, the checkpoint data including an address in the media maintenance program for resuming execution in the event that the media maintenance program is aborted by a fault, and control information including data indicative of whether an alternate track has been assigned for the selected track, reading the checkpoint data from the selected area of the nonvolatile storage after media maintenance has been aborted by a fault;

storing execution environment data as specified by the checkpoint data in the RAM to restore an execution environment for the media maintenance program after media maintenance has been aborted by a fault; and resuming execution of the media maintenance program, using the execution environment, at the address in checkpoint data after media maintenance has been aborted by a fault.

* * * * *